PHOTOCONDUCTIVE DEVICES

Filed Feb. 11, 1959 2 Sheets-Sheet 1

INVENTOR
TERENCE BERNARD TOMLINSON
BY Kirschstein, Kirschstein & Ottinger
ATTORNEYS March 20, 1962 T. B. TOMLINSON 3,026,417

PHOTOCONDUCTIVE DEVICES

Filed Feb. 11, 1959 2 Sheets-Sheet 2

INVENTOR
TERENCE BERNARD TOMLINSON
BY Kirschstein, Kirschstein & Ottinger
ATTORNEYS United States Patent Office 3,026,417

Patented Mar. 20, 1962

3,026,417
PHOTOCONDUCTIVE DEVICES

Terence Bernard Tomlinson, Kenton, England, assignor to The General Electric Company Limited, London, England Filed Feb. 11, 1959, Ser. No. 792,582
Claims priority, application Great Britain Feb. 17, 1958
14 Claims. (Cl. 250—211)

This invention relates to photoconductive devices.

The present invention is particularly, though not exclusively, applicable to photoconductive devices for use in electric switching or selecting devices such as described, for example, in British patent specification No. 835,424.

One form of switching or selecting device including a photoconductive device is described in the British patent specification No. 835,424 with reference to FIGS. 1, 2 and 3. In this particular device there is a plurality of electrical conductors in electrical contact with each of the two parallel major surfaces of a body of photoconductive material, the projections of the conductors on one major surface onto the other major surface lying at right angles to the conductors on this other surface. The switching or selecting device also includes a punched card which is positioned to lie between one of the major surfaces of the photoconductive device and a light source. Holes in the punched card are positioned to allow light from this source to be incident upon the photoconductive material at only selected ones of the positions where conductors on the two major surfaces are separated by the shortest possible electrical path through that material. The positions of the holes in the punched card determines the switching or selecting function performed by the switching or selecting device, there being a comparatively low resistance path between a conductor on one of the two surfaces and a conductor on the other surface of the photoconductive material only if light is incident upon this material where the two conductors are separated by the shortest possible electrical path through that material.

It is an object of the present invention to provide an improved form of photoconductive device which may be used, for example, in a switching or selecting device such as described in British patent specification No. 835,424 with reference to FIGS. 1, 2 and 3.

According to the present invention, in a photoconductive device having a plurality of pairs of electrodes, the electrodes of each pair lying in electrical contact with, and spaced apart from one another across, a surface of a body of photoconductive material, a plurality of mutually insulated electrical conductors lie generally between the photoconductive material and a base member which serves to support that material and the conductors, each of these conductors extending through the photoconductive material at each of a plurality of spaced positions across the base member to make electrical connection with one of said electrodes, the conductors thereby making electrical connection with a first electrode from each pair of electrodes in respective groups of said pairs, and a plurality of further mutually insulated electrical conductors are connected to the second electrodes of respective pairs of electrodes from each group.

According to a feature of the present invention an electric switching or selecting device comprises a photoconductive device as specified in the preceding paragraph together with means adapted such that in operation radiations are incident upon the photoconductive material between the electrodes of only a selected one or more of the pairs of electrodes, the arrangement being such that, within the photoconductive device, the resistance of the electrical path between said conductors which are respectively connected to the first and second electrodes of any pair of electrodes, is low only if that pair is a selected pair.

The radiations to which the photoconductive material is sensitive may be radiations of light or, for example, X-ray radiations. The light may be either visible or, as in the case of infra-red radiations, invisible to the human eye.

A photoconductive device according to the present invention, together with electric switching or selecting devices including that photoconductive device, will now be described, by way of example, with reference to the accompanying drawings in which.

Figures 1, 2, 3:
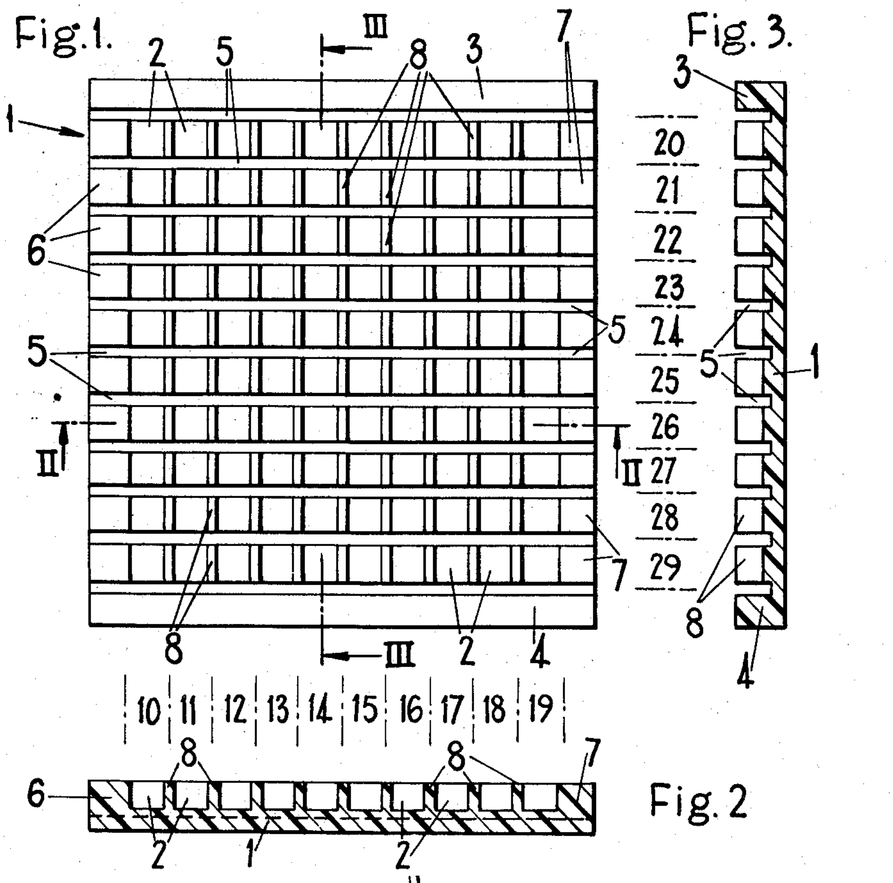
FIGURE 1 is a plan view of a base member of the photoconductive device.
FIGURE 2 is a sectional elevation taken on the line II—II of FIGURE 1.
FIGURE 3 is a sectional elevation taken on the line III—III of FIGURE 1.
Figure 4:
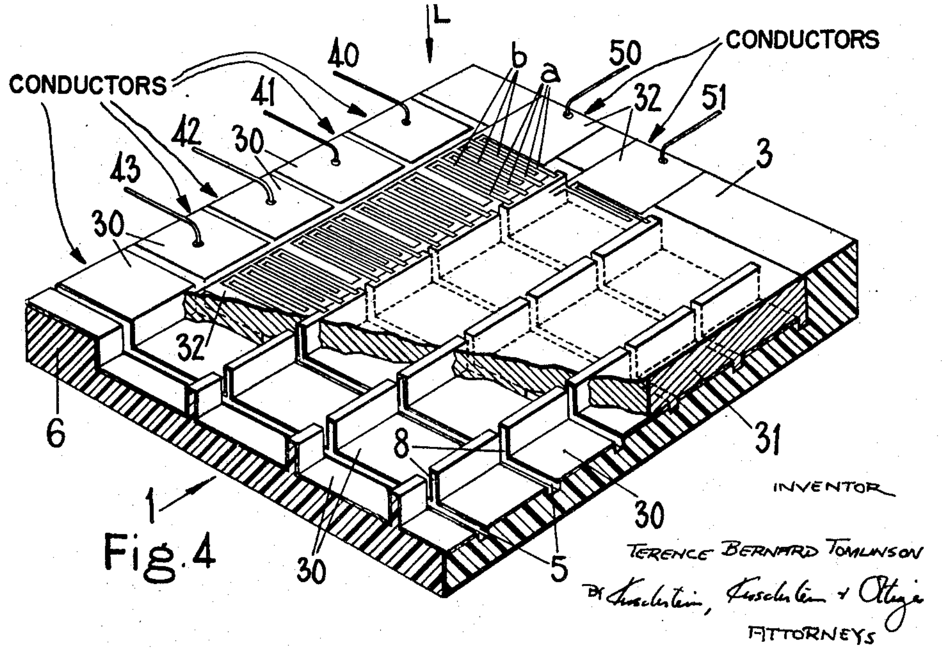
FIGURE 4 is a perspective view, partly broken away, of the photoconductive device.
Figure 5:
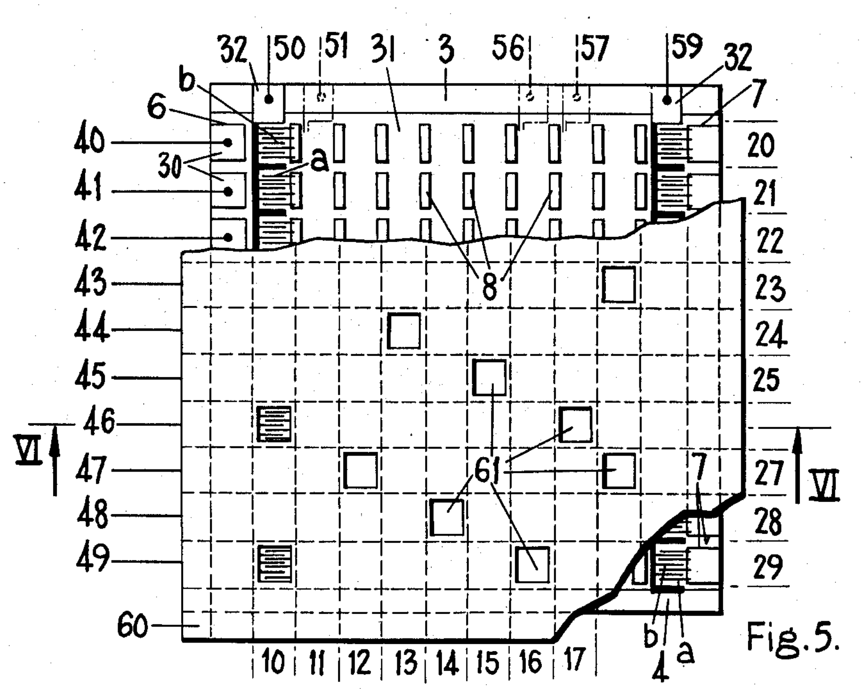
Figure 6:
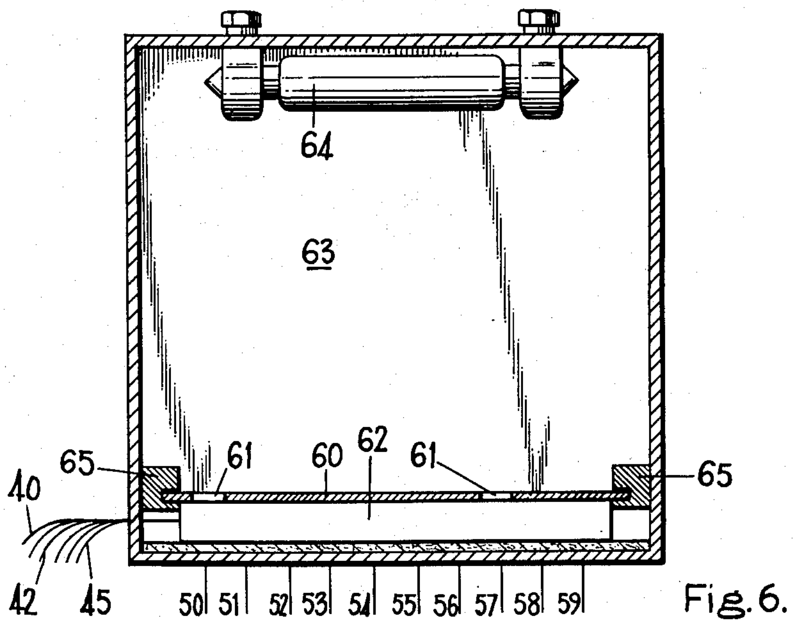

FIGURE 5 is a plan view of a switching or selecting device comprising the photoconductive device represented in FIGURE 4, and a punched card, this card being shown partly broken away; and FIGURE 6 is a diagrammatic sectional elevation of a switching or selecting device including the photoconductive device and the card shown in FIGURE 5, the section of this figure being taken on a line corresponding to the line VI—VI of FIGURE 5.

Referring to FIGURES 1 to 5, one hundred pairs of electrodes are disposed in ten columns 10 to 19 and in ten rows 20 to 29 over, and in electrical contact with, a common surface of photoconductive material 31. One of the electrodes in each pair comprises a set of four interconnected electrode elements *a* and the other electrode comprises a set of interconnected electrode elements *b*, the elements *a* and *b* which are of gold being deposited upon the material 31 by evaporation (some only of the elements *a* and *b* are shown in FIGURES 4 and 5.) The two sets of elements *a* and *b* in each electrode pair are spaced apart from one another with the elements of each set interleaved with the elements of the other set.

The photoconductive material 31 is deposited over ten conductors or electrically conductive layers 30 which are disposed along the lengths of the rows 20 to 29 across a base member 1. Each of these layers 30 is in fact a layer of gold deposited by evaporation upon the base member 1.

The base member 1, which is of electrically insulating material, is formed to have ten spaced channels 2 extending along the columns 10 to 19 respectively, between shoulders 3 and 4 at opposite ends of that member 1.

Eleven grooves 5 extend across the member 1 to intersect the channels 2 and to divide shoulders on opposite sides of the member 1 into ten shoulder portions 6 on one side, and ten shoulder portions 7 on the other side. The grooves 5 also intersect those portions of the member 1 which separate the channels 2, to form nine rows of ten ridge portions 8, and thereby separate the layers 30 from one another.

Each of the layers 30 extends across the member 1 from the shoulder portion 6 in its respective row to the shoulder portion 7 of that row, following the contour of the member 1 into each of the channels 2 and over each of the ridge portions 8.

Each of the layers 30 extends outwardly through the photoconductive material 31 at the positions along its respective row where that layer lies over a ridge portion 8. In this manner each of the layers 30 makes electrical connection along its respective row with a set of the electrode elements *a* in each of the columns 10 to 18. The layers 30 project slightly above the surface of the photoconductive material 31 over the ridge portions 8, and the elements *a* in the columns 10 to 18 are deposited partly on the projecting portions of the layers 30 to ensure good electrical connection between the sets of elements *a* and the layers 30.

In the column 19 electrical connection is made between the sets of electrode elements *a* of the rows 20 to 29 and the respective layers 30 where those layers lie over the shoulder portions 7. The elements *a* in this column are deposited to lie partly on the layers 30 over these shoulder portions 7 to ensure a good electrical connection between those elements and the layers 30.

Ten conductors or further gold layers 32 are deposited by evaporation upon the surface of the photoconductive material 31 to lie along respective columns 10 to 19. Each of the layers 32 makes electrical connection along its column with sets of elements *b* in each of the rows 20 to 29, the elements *b* being deposited on this surface at the same time as the layers 32 to ensure good electrical connection between those elements *b* and the layers 32.

Electrical connection is made to the ten layers 30 by respective ones of ten leads 40 to 49, and to the ten layers 32 by respective ones of ten leads 50 to 59.

If in operation light is directed in the direction of the arrow L of FIGURE 4 to be incident upon the surface of the photoconductive material 31 between the elements *a* and *b* of any one of the electrode pairs, the electrical resistance of this portion of the photoconductive material assumes a low value compared with that when no such light is so incident. As a result the resistance between the layers 30 and 32 connected to the sets of elements *a* and *b* in that electrode pair assumes this low value also.

The fact that the electrode elements *a* and *b* lie on the same surface of the photoconductive material 31 ensures that light incident upon the photoconductive material between them has the maximum effect and does not depend upon the penetration into the body of photoconductive material 31 by that light. In the photoconductive device described in British patent specification No. 835,-424 with reference to FIGS. 1, 2 and 3, the effective pairs of electrodes are on opposite surfaces of a body of photoconductive material so that the resulting change in resistance between any pair of electrodes for light incident upon that device is dependent upon the penetration of that light within the body of photoconductive material between those electrodes. Thus this latter photoconductive device requires a much higher intensity of light than is required with the photoconductive device described above with reference to FIGURES 1 to 5 of the drawings accompanying the present application, to produce a corresponding change in resistance between the electrode pairs. The fact that the electrode elements *a* and *b* in the present case are interleaved is also of advantage in this respect since the resistance between the electrodes of each pair depends directly upon the lengths of those edges of the electrodes which lie opposite one another across the photoconductive material, but inversely upon the distance between those edges.

The photoconductive device described above with reference to FIGURES 1 to 5 of the accompanying drawings may be used in combination with, for example, a punched card 60, as shown in FIGURE 5, to form a switching or selecting device.

Referring specifically to FIGURE 5, the card 60 having a number of holes 61 punched therethrough, is situated adjacent to the surface of the photoconductive material 31 to interrupt light, except at the holes 61, which would otherwise be incident upon the whole of that surface. The holes 61 are located at selected intersections of the columns 10 to 19 with the rows 20 to 29 such that light passing through these holes 61 is incident upon the photoconductive material 31 between the electrode elements *a* and the electrode elements *b* at those selected intersections. For example, one of the holes 61 is located at the intersection of the column 10 with the row 26, another at the intersection of the column 10 with the row 29, and another at the intersection of the column 16 with the row 29.

The photoconductive device together with the card 60, is preferably enclosed within a light-tight box as shown for example, in FIGURE 6.

Referring to FIGURE 6, the photoconductive device which will be referred to hereinafter as the "photoconductive device 62" (and which is not shown in section in FIGURE 6), is positioned within a light-tight box 63 such that light from a tungsten filament lamp 64, also enclosed within the light-tight box 63, is only incident upon the photoconductive device 62 through the holes 61 in the card 60. The card 60 is retained in a position adjacent to the surface of the photoconductive material 31 in the device 62, by slotted members 65. The leads 40 to 49 (only some of which are shown in FIGURE 6) and 50 to 59 pass out from the box 63, and it is arranged that the card 60 may be readily withdrawn from within the box 63, but that even with these latter provisions the box 63 remains substantially light-tight.

In operation, light from the lamp 64 is incident, as indicated above, upon the photoconductive material 31 through the holes 61. As a result, the resistance of the photoconductive material 31 between the electrode elements *a* and *b* at each of those intersections where light is incident, assumes a low value compared with that when no light is so incident. For example, the card 60 has a hole 61 punched therethrough at the intersection of the column 10 with the row 26, and therefore light is incident upon the photoconductive material 31 in the device 62 between the electrode elements *a* and *b* at this intersection. This results in there being a relatively low resistance path between the layer 30 in the row 26 and the layer 32 in the column 10, and therefore, between the lead 46 and the lead 50. Similarly, the card 60 has a hole 61 punched therethrough at the intersection of the column 10 with the row 29, and light is incident upon the photoconductive material 31 between the electrode elements *a* and *b* at this intersection, this resulting in the path between the lead 49 and the lead 50 assuming a relatively low value of resistance.

No light is incident upon the photoconductive material 31 at those intersections for which there are no holes such as the holes 61, punched through the card 60. For example, no light is incident upon the photoconductive material 31 at the intersection of the column 11 with the row 26, the electrical resistance of the photoconductive material 31 between the electrode elements *a* and *b* at this intersection being, as a result, relatively high. In view of this there is a relatively high resistance path between the layer 30 in the row 26 and the layer 32 in the column 11, and therefore between the lead 46 and the lead 51. Similarly, no light is incident upon the photoconductive material 31 at the intersection of the row 27 with the column 10, and therefore there is a relatively high resistance path between the lead 47 and the lead 50.

As a result, there is a relatively low resistance path between certain of the leads 40 to 49 and certain of the leads 50 to 59, but a relatively high resistance path between others of those leads. The particular ones of these leads 40 to 59 between which there is a low resistance path (and consequently the particular ones of those leads between which there is a high resistance path) is of course dependent upon the positioning of the holes 61 in the card 60.

The switching or selecting device of FIGURE 6 may be incorporated in a translator (not shown) for an automatic telephone exchange, the translator providing, on the reception of signals indicating the destination of a call to be passed through that exchange, output signals which in themselves indicate, for example, the correct routing of that call through the exchange. Such translators are required, in particular, in so-called nation-wide or subscriber trunk dialing systems.

It is arranged that when one of ten different code signals is passed to the translator incorporating the arrangement shown in FIGURE 6, a pulse signal is applied as a result from a relatively low resistance source (not shown), between one of the leads 40 to 49 and earth. The resistance of the source may be, for example, only one-tenth of the resistance between the electrode elements *a* and *b* of an electrode pair when light is incident upon that photoconductive material at that intersection. Each of the ten leads 40 to 49 is arranged to be associated with an individual one of the ten code signals, the pulse signal being applied only to that one of the leads 40 to 49 which is associated with the code signal passed to the translator. In addition, the leads 50 to 59 are each connected to earth through the winding of a respective relay (not shown), the resistance of each such winding being comparable with the resistance of each of the sources connected to the leads 40 to 49.

It will be assumed for the purposes of the present description that as a result of a particular code signal applied to the translator, a pulse signal is as a result applied between the lead 46 and earth.

In view of the fact that holes 61 are positioned in the row 26 only where this row intersects the columns 10 and 17, there is a relatively low resistance path between the lead 46 and each of the leads 50 and 57, but a relatively high resistance path between the lead 46 and each of the leads 51 to 56, 58 and 59. The application of the pulse signal between the lead 46 and earth results therefore, in the passage of relatively large currents through the windings of the relays connected to the leads 50 and 57, but of only relatively small currents through the windings of the other relays.

Due to the fact that there is a plurality of holes 61 in the card 60 light is incident simultaneously upon the photoconductive material 31 at a plurality of the intersections of the columns 10 to 19 with the rows 20 to 29. It might be supposed therefore, that while a pulse signal is applied between the lead 46 and earth, the currents through others of the relays connected to the leads 50 to 59 would be relatively large also. For example, holes 61 are located in the card 60 at the intersection of the column 10 with the row 29, and at the intersection of the column 16 with the row 29, in addition to the holes 61 located at the intersections of the columns 10 and 16 with the row 26. It might be expected therefore that there will be a relatively low resistance path extending from the lead 46, through the photoconductive material 31 between the electrode elements *a* and *b* at the intersection of the column 10 with the row 26, along the layer 32 in column 10, through the photoconductive material 31 between the electrode elements *a* and *b* at the intersection of the column 10 with the row 29, along the layer 30 in the row 29, through the photoconductive material 31 between the electrode elements *a* and *b* at the intersection of the column 16 with the row 29, and along the layer 30 in the column 16, to the lead 56. However, due to the non-linear relationship between applied voltage and the resulting current as exhibited by the photoconductive material 31, the resistance of such an unwanted path is in fact relatively large compared with that extending from the lead 46 to the lead 50. This non-linear relationship is such that the resulting current between the sets of electrode elements *a* and *b* of any electrode pair due to the application of a voltage between those two sets is dependent upon for example, the fourth power of that applied voltage.

By arranging that the resistances of the relay windings are each low, for example one-tenth, of the resistance between the electrodes of each pair when light is incident upon the photoconductive material between those electrodes, the voltages appearing across the pairs of electrodes in any unwanted path to cause current to flow in that path are low compared with the input voltage. This fact in conjunction with the non-linear relationship between applied voltage and resulting current causes the current through the above unwanted path extending between the lead 46 and the lead 56 to be negligibly small, this path extending through the photoconductive material 31 between electrode elements *a* and *b* at three of the intersections. Similarly any other such path between the lead 46 and any one of the leads 51 to 56, 58, and 59, extends through the photoconductive material 31 between electrode elements *a* and *b* at a minimum of three of the intersections, so that the current through the windings of the relays connected to any of these leads and due to any such paths, will be negligibly small.

The resistance of the path between the lead 46 and each of the leads 51 to 56, 58, and 59, may be some five thousand times greater than the resistance of the path between the lead 46 and the lead 50 and that between the lead 46 and the lead 57. Therefore the relays connected to the leads 50 to 59 are easily arranged to be responsive only to the relatively large currents such as flow between the lead 46 and each of the leads 50 and 57, when the pulse signal is applied to the lead 46. As a result, only the relays connected to the leads 50 and 57 are operated upon the application of the pulse signal to the lead 46, and in this manner the combination of the relays which are so operated (or, likewise, the combination of those which remain unoperated) provides an indication of the translation of the code signal applied to the translator.

In a similar manner any other code signal applied to the translator is translated as required, the particular combination of relays which are operated as a result of such application (or, likewise, the combination of relays which remain unoperated during such application) providing an indication of this translation. Each of the relays may be provided with contacts which when that relay is operated (or remains unoperated) apply, for example, a pulse signal to other apparatus in the exchange, the combination of pulse signals so applied being characteristic of the code signal applied to the translator, and possibly, of the desired routing of, and charge to be made for, a call set-up through the exchange as a result of that code signal.

The actual translation provided by the translator is dependent upon the number and positioning of the holes 61 in the card 60 at the intersections of the columns 10 to 19 with the rows 20 to 29, thus the translation provided thereby may be changed simply by replacing that card 60 with another such card having a different distribution of holes therein. Cards such as the card 60 may be punched with holes such as the holes 61, at a central office, and then distributed to telephone exchanges incorporating this form of translator. Thus the operation of changing the routing of calls, and, or alternatively, the charges to be made for such calls, is relatively simple.

Although the operation of the switching or selecting device as shown in FIGURE 6 has been described above in relation to a translator for use in an automatic telephone exchange, it will be appreciated that such a device is also applicable for use in other ways in automatic telephone exchanges, and also in other types of apparatus such as, for example, computers.

The base member 1 may be moulded from a cold setting resin such as that sold as "Marco Resin SB.28C" by Scott Bader & Co. Ltd., the grooves 5 being cut in this member after the moulding operation.

The gold for the layers 30 may be deposited as a single layer upon the base member 1 before the grooves 5 are cut, the subsequent operation of cutting those grooves separating this single layer into the ten layers 30.

The leads 40 to 49 and 50 to 59 may be attached to the strips 30 and 32 by an electrically conductive silver paste.

The photoconductive material 31 may be any suitable material which is both photo-sensitive and has a relatively high electrical resistance when light is not incident thereon. A suitable material is, for example, cadmium sulphide activated with copper and chlorine. A method of manufacturing such material is described in British patent specification No. 823,187.

The photoconductive material 31, mixed with a binder such as ethyl cellulose, may be painted on the member 1 using a solvent, for example, amyl acetate. Alternatively, the photoconductive material 31 may be deposited upon the member 1 by settling from a solution of benzene or amyl acetate containing ethyl cellulose as a binder.

In order to protect the photoconductive device this may be totally encased in, for example, a substantially transparent synthetic resin such as that sold as "Marco Resin SB.28C" by Scott Bader & Co. Ltd., after initially coating the device with a solution of disthene in xylene.

I claim:

1. A photoconductive device comprising photoconductive material; a plurality of groups of pairs of electrodes in electrical contact with and spaced from one another across a surface of the photoconductive material; a plurality of mutually insulated electrical conductors; a base member supporting the photoconductive material and said conductors; each of said conductors comprising first portions secured to the base member between the photoconductive material and the base member, and second portions which extend through the photoconductive material from said first portions to said surface at spaced positions across the base member to make electrical connection with first electrodes respectively of the pairs of electrodes in a respective one of said groups, the said first portions interconnecting said second portions; and a plurality of further mutually insulated electrical conductors which are electrically connected in each group to the second electrodes of the pairs of electrodes respectively.

2. A photoconductive device comprising photoconductive material; a plurality of groups of pairs of electrodes in electrical contact with and spaced from one another across a surface of the photoconductive material; a plurality of mutually insulated electrical conductors; a base member supporting the photoconductive material and said conductors, the base member having a plurality of ridge portions that extend outwardly through the photoconductive material at spaced positions across the base member; each of said conductors comprising first portions that are secured to the base member between the photoconductive material and the base member, and second portions that at the ridge portions of the base member extend through the photoconductive material from said first portions to said surface to make electrical connection with first electrodes respectively of the pairs of electrodes in a respective one of said groups, the said first portions interconnecting said second portions; and a plurality of further mutually insulated electrical conductors that are electrically connected in each group to the second electrodes of the pairs of electrodes respectively.

3. A photoconductive device according to claim 2 wherein each of the first-mentioned conductors is a layer of electrically conductive material deposited upon the base member, this layer extending over the ridge portions to thereby extend outwardly through the photoconductive material at said positions across the base member.

4. A photoconductive device according to claim 3 wherein the base member is of electrically insulating material, and has a plurality of grooves therein which separate from one another those portions of the base member on which said first mentioned conductors are deposited.

5. A photoconductive device comprising a body of photoconductive material having a plane surface; a plurality of mutually spaced pairs of electrodes that are in electrical contact with, and are disposed in rows and columns on, said surface of the photoconductive material; a plurality of mutually insulated electrical conductors; a base member supporting the photoconductive material and said conductors; each of said conductors comprising first portions that are secured to the base member between the photoconductive material and the base member, and second portions that extend through the photoconductive material from said first portions to said surface at spaced positions across the base member to make electrical connection with first electrodes respectively of the pairs of electrodes in a respective one of said rows, the said first portions interconnecting said second portions; and a plurality of further mutually insulated electrical conductors that are electrically connected to the second electrodes in the columns respectively.

6. A photoconductive device according to claim 5 wherein said further conductors lie on said common surface along the lengths of said columns respectively.

7. A photoconductive device according to claim 5 wherein each of the electrodes comprises a plurality of interconnected electrode elements, and wherein the elements of the two electrodes of each pair are interleaved with one another.

8. A photoconductive device according to claim 5 wherein said electrodes are of gold.

9. A photoconductive device according to claim 5 wherein the photoconductive material is cadmium sulphide.

10. A photoconductive device according to claim 9 wherein the cadmium sulphide is activated with copper and chlorine.

11. An electric switching or selecting device comprising photoconductive material; a plurality of groups of pairs of electrodes in electrical contact with and spaced from one another across a surface of the photoconductive material; a plurality of mutually insulated electrical conductors; a base member supporting the photoconductive material and said conductors; each of said conductors comprising first portions secured to the base member between the photoconductive material and the base member, and second portions which extend through the photoconductive material from said first portions to said surface at spaced positions across the base member to make electrical connection with first electrodes respectively of the pairs of electrodes in a respective one of said groups, the said first portions interconnecting said second portions; a plurality of further mutually insulated electrical conductors which are electrically connected in each group to the second electrodes of the pairs of electrodes respectively; and means to interrupt radiations that are directed towards all said pairs of electrodes to allow the radiations to be incident upon the photoconductive material between the electrodes of selected ones only of said pairs of electrodes.

12. An electric switching or selecting device according to claim 11 wherein the means to interrupt radiations is a substantially opaque card having holes passing therethrough at positions corresponding to said selected pairs of electrodes.

13. An electric switching or selecting device according to claim 12 including a source of light to direct light towards all said pairs of electrodes.

14. An electric switching or selecting device according to claim 13 wherein said source of light is a tungsten filament lamp.

References Cited in the file of this patent

UNITED STATES PATENTS

| | | |
|---|---|---|
| 2,605,965 | Shepherd | Aug. 5, 1952 |
| 2,668,184 | Taylor et al. | Feb. 2, 1954 |
| 2,668,877 | Gent et al. | Feb. 9, 1954 |
| 2,728,835 | Mueller | Dec. 27, 1955 |
| 2,747,104 | Jacobs | May 22, 1956 |
| 2,789,193 | Anderson | Apr. 16, 1957 |
| 2,899,659 | McIlvaine | Aug. 11, 1959 |
| 2,923,828 | Bernath | Feb. 2, 1960 |